(12) United States Patent
Marivoet et al.

(10) Patent No.: US 8,914,159 B2
(45) Date of Patent: Dec. 16, 2014

(54) APPARATUS AND METHOD FOR CONTROLLING POWER

(75) Inventors: Philip Marivoet, Tienen (BE); Yoeri Apts, Zemst (BE); Alfred Spiessens, Hingene (BE); Christopher Rutherford, Schaerbeek (BE); Chris Minnoy, Holsbeek (BE); Hamish Guthrie, Scuol (CH)

(73) Assignee: Sony Corporation, Tokyo (JP)

( * ) Notice: Subject to any disclaimer, the term of this patent is extended or adjusted under 35 U.S.C. 154(b) by 424 days.

(21) Appl. No.: 13/210,960

(22) Filed: Aug. 16, 2011

(65) Prior Publication Data

US 2012/0059529 A1    Mar. 8, 2012

(30) Foreign Application Priority Data

Sep. 6, 2010  (GB) .................................. 1014767.6

(51) Int. Cl.
*G05D 11/00* (2006.01)
*H04L 12/10* (2006.01)
*H04L 12/28* (2006.01)

(52) U.S. Cl.
CPC ............ *H04L 12/10* (2013.01); *H04L 12/2827* (2013.01); *H04L 12/2829* (2013.01); *Y02B 70/325* (2013.01); *Y02B 60/33* (2013.01); *Y04S 20/228* (2013.01)
USPC .............................. 700/295; 705/307; 361/62

(58) Field of Classification Search
USPC ............................... 700/295; 705/307; 361/62
See application file for complete search history.

(56) References Cited

U.S. PATENT DOCUMENTS

| | | | |
|---|---|---|---|
| 2004/0057177 A1* | 3/2004 | Glahn et al. ..................... 361/62 |
| 2006/0061795 A1* | 3/2006 | Walmsley ..................... 358/1.14 |
| 2006/0067592 A1* | 3/2006 | Walmsley et al. ............ 382/303 |
| 2006/0129806 A1* | 6/2006 | Walmsley ..................... 713/161 |
| 2006/0139681 A1* | 6/2006 | Walmsley ..................... 358/1.14 |
| 2006/0164454 A1* | 7/2006 | Walmsley et al. .............. 347/14 |
| 2006/0294312 A1* | 12/2006 | Walmsley ..................... 711/122 |
| 2007/0019016 A1* | 1/2007 | Silverbrook et al. ........... 347/13 |
| 2007/0083491 A1* | 4/2007 | Walmsley et al. ................ 707/3 |
| 2008/0010473 A1* | 1/2008 | Harris ........................... 713/300 |
| 2009/0046260 A1* | 2/2009 | Jansen ............................. 355/30 |
| 2009/0262929 A1* | 10/2009 | Walmsley ....................... 380/46 |

(Continued)

FOREIGN PATENT DOCUMENTS

| | | |
|---|---|---|
| EP | 1 566 875 A1 | 8/2005 |
| GB | 2467813 A | 8/2010 |
| WO | WO 01/37392 A1 | 5/2001 |
| WO | WO 2008/071995 A2 | 6/2008 |

OTHER PUBLICATIONS

U.S. Appl. No. 13/210,708, filed Aug. 16, 2011, Marivoet, et al.

(Continued)

*Primary Examiner* — Mohammad Ali
*Assistant Examiner* — Anthony Whittington
(74) *Attorney, Agent, or Firm* — Oblon, Spivak, McClelland, Maier & Neustadt, L.L.P.

(57) ABSTRACT

A method of controlling power to a plurality of devices on an energy network, wherein each device has an identifier which uniquely identifies the device on the network, the method comprising: forming a group of devices from said plurality of devices; and controlling the power of other devices in said group in accordance with the state of the power supplied to a first device in said group.

17 Claims, 5 Drawing Sheets

(56) References Cited

U.S. PATENT DOCUMENTS

| | | | |
|---|---|---|---|
| 2010/0082174 A1* | 4/2010 | Weaver | 700/295 |
| 2010/0156913 A1* | 6/2010 | Ortega et al. | 345/520 |
| 2010/0277527 A1* | 11/2010 | Silverbrook et al. | 347/9 |
| 2010/0332373 A1* | 12/2010 | Crabtree et al. | 705/37 |

OTHER PUBLICATIONS

United Kingdom Search Report issued Mar. 17, 2011, in United Kingdom Application No. 1014767.6, filed Sep. 6, 2010.

* cited by examiner

APPARATUS AND METHOD FOR CONTROLLING POWER

BACKGROUND OF THE INVENTION

1. Field of the Invention

The present invention relates to an apparatus and method for controlling power.

2. Description of the Prior Art

Recently, consumers have become acutely aware of their environmental impact. Moreover, as energy prices continue to rise, consumers are looking at different ways to manage their energy consumption. In particular, consumers are interested in managing their electrical consumption.

It is an aim of the present invention to address this issue.

SUMMARY OF THE INVENTION

According to a first aspect, there is provided a method of controlling power to a plurality of devices on an energy network, wherein each device has an identifier which uniquely identifies the device on the network, the method comprising: forming a group of devices from said plurality of devices; and controlling the power of other devices in said group in accordance with the state of the power supplied to a first device in said group by sending control signals over the energy network.

The method may further comprise controlling the power to each device in said group in accordance with a user defined criterion.

The method may further comprise allocating a priority to each of the devices in the group, wherein the one device in said group is the device with the highest priority.

The method may further comprise detecting the power consumed by said one device in the group and when said power consumed is below a threshold, controlling the power to the other devices in said group.

When said detected power consumed by said one device in the group is below the threshold but above a second threshold, the method may assume that the device is in a standby power state.

At least one device in said group may be placed into standby.

According to another aspect, there is provided a computer program containing computer readable instructions which, when loaded onto a computer, configure the computer to perform a method according to any one of the above.

A computer program product configured to store the computer program of the above therein or thereon.

According to another aspect, there is provided an apparatus for controlling power to a plurality of devices on an energy network, wherein each device has an identifier allocated thereto which uniquely identifies the device on the network, the apparatus comprising a group former operable to form a group of devices from said plurality of devices; and a controller operable to control the power to each device in said group in accordance with the state of the power supplied to one device in said group by sending control signals over the energy network.

The controller may be operable to control the power to each device in said group in accordance with a user defined criterion.

The apparatus may comprise a priority allocator operable to allocate a priority to each of the devices in the group, wherein the one device in said group is the device with the highest priority.

The apparatus may comprise a detector operable to detect the power consumed by said one device in the group and when said power consumed is below a threshold, controlling the power to the other devices in said group.

When said detected power consumed by said one device in the group is below the threshold but above a second threshold, the apparatus may assume that the device is in standby and controlling the power to the other devices in said group.

At least one device in said group may be placed into standby.

According to another aspect, there is provided a system comprising:
an apparatus according to any one of the above coupled to a plurality of devices.

BRIEF DESCRIPTION OF THE DRAWINGS

The above and other objects, features and advantages of the invention will be apparent from the following detailed description of illustrative embodiments which is to be read in connection with the accompanying drawings, in which.

DESCRIPTION OF THE PREFERRED EMBODIMENTS

Figure 1:
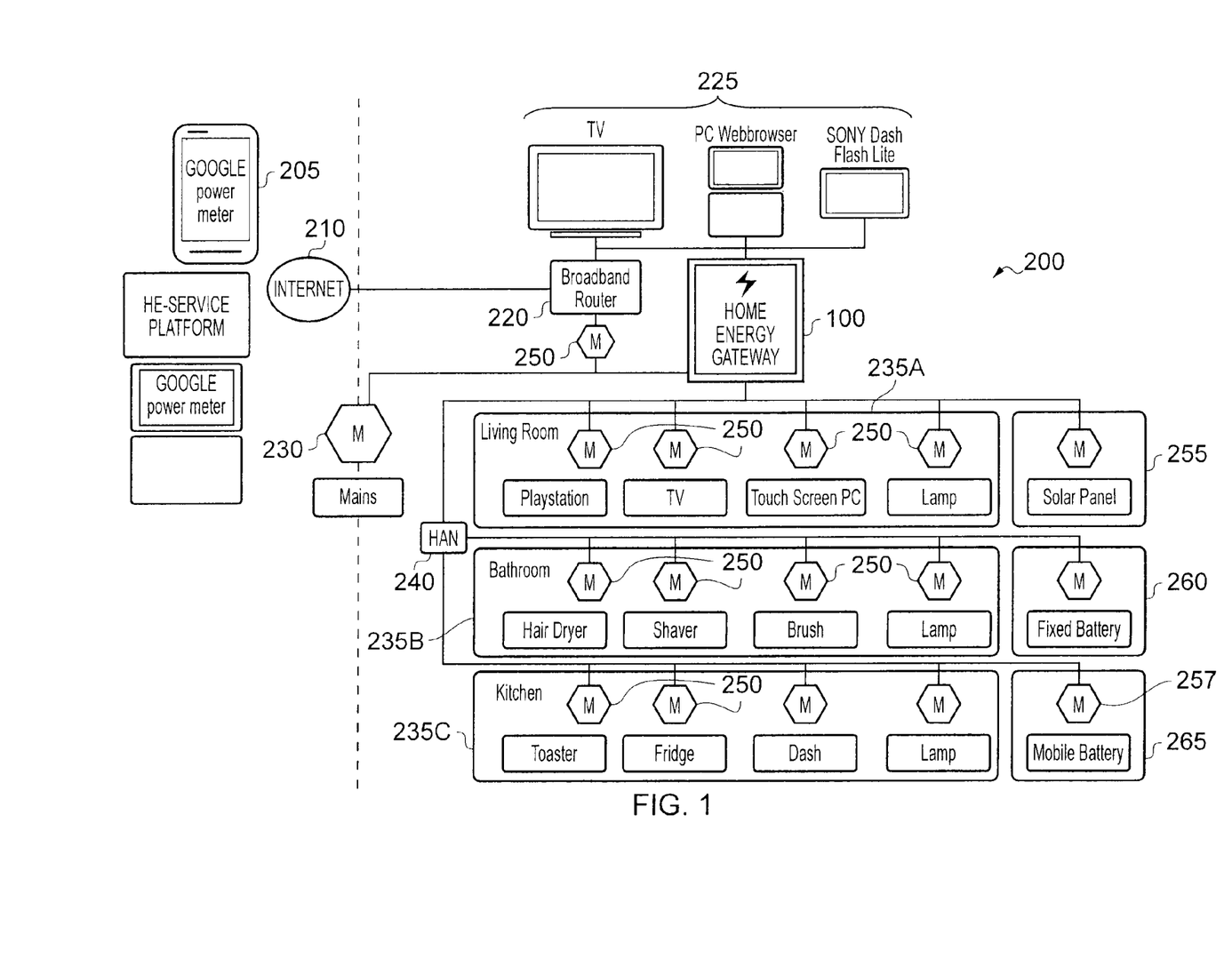
FIG. 1 describes a home energy network according to embodiments of the present invention.

FIG. 1 describes a home energy network 200. This network 200 is located within a user's home. However, the invention is not so limited. Within the network 200, a home energy gateway (HEG) 100 is provided. The HEG 100 will be explained fully with reference to FIG. 2. However, the HEG 100 is a device that is connected to a main supply of electricity 230. This mains supply is a single phase, 220V alternating current (AC) domestic supply. However, the invention is not so limited. The invention may be applied to an industrial supply having three phases, or may be a domestic supply having a different voltage, for example 110V AC supply. It is envisaged that the home energy gateway will be installed to take the power from a wall socket. A smart meter will be installed between the circuit breaker and the ring main within a domestic house. This allows the smart meter to measure the mains consumption. The HEG 100 will request these measurements from the smart meter. This allows the HEG 100 to control the power supplied to each device attached to the main supply within the domestic dwelling, whilst still being protected from surges in power that would potentially damage the HEG 100.

Additionally, the HEG 100 is connected to the Internet 210 using a broadband router 220. The broadband router 220 may be wirelessly connected to the HEG 100, or indeed wired to the HEG 100. The router 220 is connected to a television, PC web browser and a Sony® Dash®, although other connectable devices are envisaged in addition to or as an alternative to these mentioned devices. These display/control devices 225 connected to the router 220 will be explained hereinafter with reference to FIG. 3.

As the HEG 100 is connected to the Internet 210, the user is able to view the energy statistics of the network 200 whilst the user is away from the premises. In particular, the user may view the statistics using an appropriate interface such as Google Power meter. This may be viewed on an Android enabled device such as an Xperia X10 made by Sony Ericsson. Alternatively, the user may access a WiFi network using a Sony Vaio netbook and may use Google Power meter to view the energy statistics of their premises or indeed configure the HEG 100 in any suitable manner. Different scenarios will be explained later.

The HEG 100 is also connected to a Home Area Network (HAN) 240. The HAN 240 is a controller for each plug socket 250 in the home. The plug sockets 250 within the home 250 will be described later with reference to FIG. 3. However, each plug socket 250 has an identifier which uniquely identifies that plug socket within the home. In other words, the plug socket 250 will have an identifier attributed to it that is unique within the home, but may or may not be globally unique. However, the invention is not so limited. In embodiments, the plug sockets may have smart meters inserted therein. These smart meters would, in this case, have the identifiers attributed thereto. In embodiments, the HEG 100 will allocate the plug socket identifier during an initial setup operation of the system.

The plug sockets 250 are allocated into 3 different groups, 235A, 235B and 235C. These groups may be allocated in terms of location of the plug sockets 250. For example, in the specific embodiment, the plug sockets in the living room are allocated as together as group 235A, the plug sockets in the bathroom are allocated as together as group 235B, and the plug sockets in the kitchen are allocated as together as group 235C. However the invention is not so limited. Indeed, any kind of grouping of plug sockets is envisaged. Moreover, one plug socket may be allocated to one or more groups.

So far, only consumers of electrical power have been described. However, in embodiments, electrical generators may be connected to the network 200 instead of or in addition to the consumer devices. In embodiments, a solar panel 255 may be connected. Additionally, connected to the network are other devices that can act as electrical consumers or electrical generators. For example, a fixed battery 260 and an electric vehicle 265 are connected to the network 200 using a plug socket. The fixed battery 260 is an array of battery cells which may be charged when electricity is plentiful, such as when few other electrical consumer devices are operating and the solar panels 255 are generating electricity or when electricity is at a cheaper rate, for example overnight. The electricity held by the fixed battery 260 is used by the home network when electrical demand is high, or the cost of externally generated electricity is high. Similarly, the batteries for the electric vehicle 265 will act in a similar manner to the fixed battery 260 by storing energy when it is cheaper or plentiful and using the energy when it is more expensive.

Additionally, a so-called "green plug" 257 is shown as connecting the electric vehicle 265 to the network 200. The "green plug" 257 may be a physical device as shown in general in FIG. 1, but may also be a grouping of plug sockets 250 as will be explained later.

Figure 2:
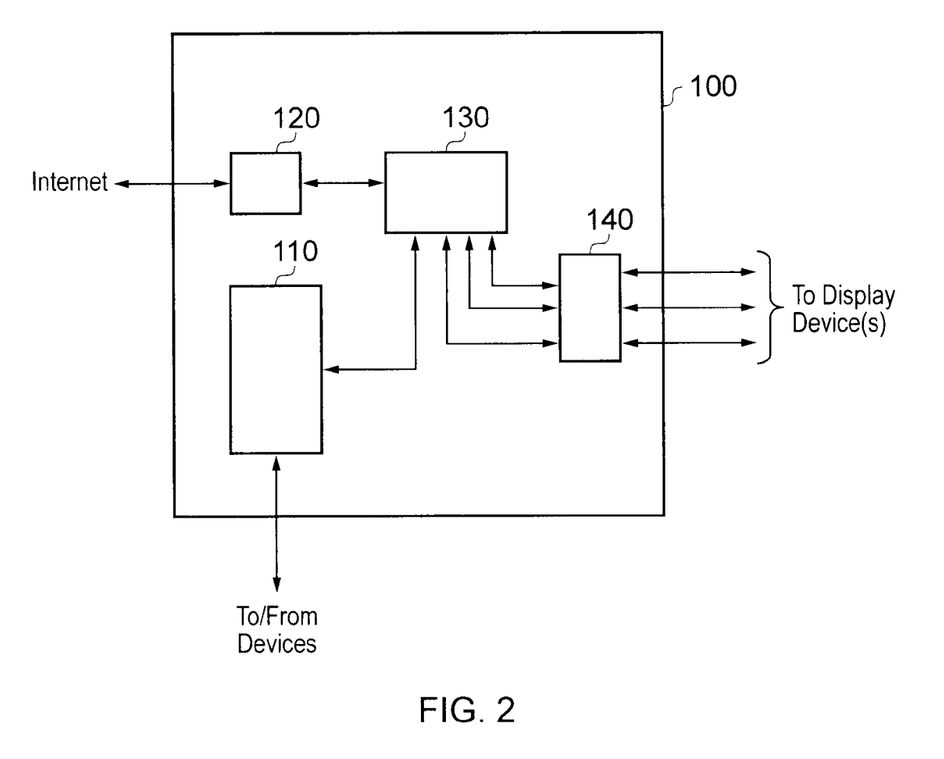
FIG. 2 describes a home energy distribution device according to embodiments of the present invention.

FIG. 2 shows an embodiment of the HEG 100. The HEG 100 includes a controller 130 which has the HAN connected thereto. The controller 130 controls the HAN which in turn controls the other plug sockets 250. In particular, the controller 130 sends control signals to the plug sockets 250, via the HAN, to control the operation of the plug socket. Additionally, the controller 130 receives data back from the plug sockets, via the HAN 240, which determines the power consumption of a device connected to the plug socket 250. The controller 130 is, in embodiments, a microprocessor which is configured to be controlled by software code. The software code may be stored on the HEG 100 in memory (not shown), or may be controlled by software which is located remotely, for example over the Internet, or a home computer network. The software may be stored on any computer readable medium such as solid state memory, or a magnetic or optically readable medium. Indeed, the software may be stored in the controller itself allowing the software to be updated from other locations.

The controller 130 is connected to a communication device 120 which enables the HEG 100 to be connected to the Internet. The communication device 120 is configured to allow the remote devices 205 to have information displayed thereon, but also allows the users of the remote devices to interface with the HEG 100.

Also connected to the controller 130 is a display interlace 140. The display interface 140 connects to the display devices 225 of FIG. 1. The display interface 140 is a bi-directional interface that allows display data to be provided to the display devices 225 showing the energy consumption of the network 200, but also allows the user to interact with the display devices 225 to control the network 200 in any suitable manner. Different scenarios will be discussed later. It should be noted here that any display device can connect over the network and information from the HEG 100 may be obtained using a service interface. The display device may then decide how to display the information, for example, using an application specific to the display device.

Figure 3:
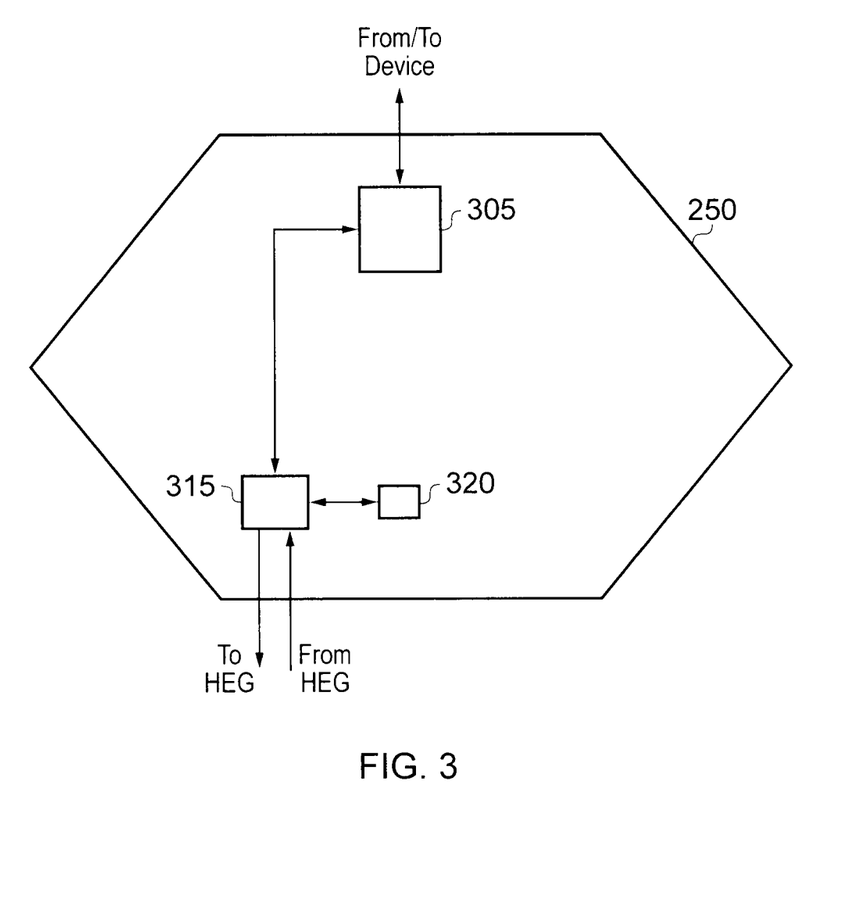
FIG. 3 describes a unit interface according to embodiments of the present invention.

FIG. 3 describes a plug socket 250 shown in FIG. 2 according to embodiments of the present invention. The plug socket is typically mounted on a wall in the home and is capable of receiving a plug from electrical devices. However, although the following plug socket 250 is mounted on a wall and can receive a plug from an electrical device, the invention is not so limited. Another example of a plug socket 250 may be a ceiling light fitting into which a light bulb is placed. The plug socket 250 should therefore be interpreted as a mounting into which an electrical device (either consuming unit or generating unit) may be removably connected.

The HEG 100 is connected to the plug socket 250 through mains interface 315. The mains interface 315 is designed to extract data packets sent over the mains system from the HEG 100. Additionally, the mains interface 315 is operable to send data packets over the mains system to the HEG 315. Such techniques for sending data over the power lines exist and are defined in systems such as the HomePlug Alliance as the skilled person would appreciate. Additionally, or alternatively, other techniques can be used for transmitting the appropriate data packets between the HEG 100 and the plug socket 250. One option would be to have wireless communication, or have a separate wired network installed. For example techniques defined in Plugwise, PloggZgb (using the Zigbee standard), PloggBt (using the Bluetooth standard), DIN meters (using Serial GPIO standard) or Flukso (using WiFi) may be used.

A memory 320 is connected to the mains interlace 315. The memory 320 is, in embodiments, non-volatile and is configured to store the unique identification data which uniquely identifies the plug socket therein.

A device adaptor 305 is also connected to the mains adapter 315. The device adaptor 305 is controlled by the mains adaptor 315 and controls the mains power to and from the device. Additionally, the device adaptor 305 is configured to read the amount of power consumed or generated by the device and to pass this data to the mains adaptor 315. The mains adaptor 315 passes this data back to the HEG 100 over the home area network. Moreover, the status of the device is monitored by the device adaptor 305. In other words, when the device is switched off by the user, the device adaptor 305 sends a flag to the mains adaptor 305 which generates data identifying the device and the current state of the device. It should be noted here that although the device adaptor 305 is described as being separate to the device, the invention is not so limited. For example, the device adaptor 305 may be integrated into the device. This data is passed to the HEG 100 over the home area network. Moreover, if the device is capable of being placed in a standby mode (such as a television), then the power consumed by the device will drop to a level such as 30% of full power. The device adaptor 305 identifies that the power consumed by the device has dropped below a certain level and that the device must be therefore in a standby mode. A flag identifying this is passed to the mains adaptor 315. The mains adaptor 315 then generates data identifying the device and the current state of the device and passes this over the network to the HEG 100.

Moreover, the device adaptor 305 is configured to send control signals to the device. In particular, the device adaptor 305 is configured to send a power down control signal to the device. This power down control signal instructs the device to enter a standby state, or to fully shut down in a period of time. In order to do this the device needs to be able to be controlled in such a manner.

Figure 4:
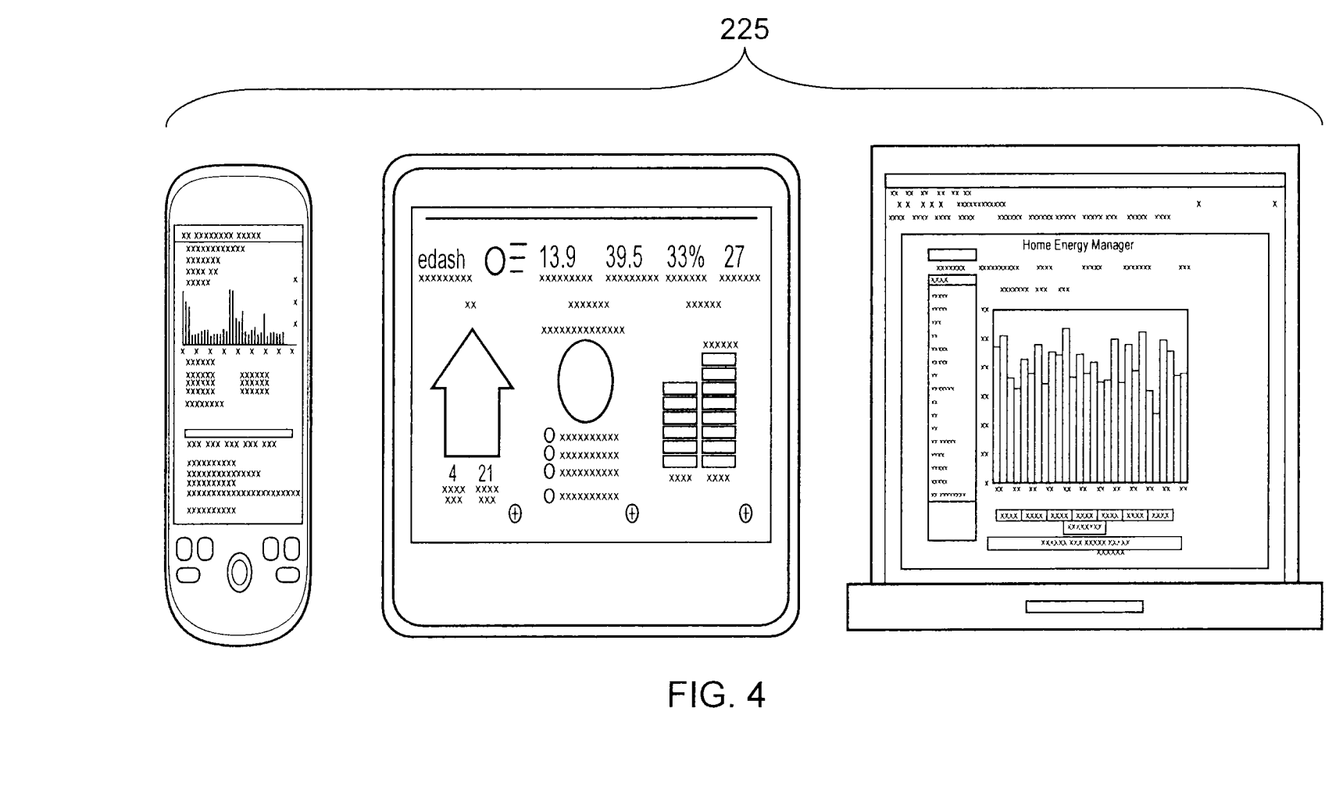
FIG. 4 describes a graphical user interface used in the home energy network according to embodiments of the present invention.
Figure 5:
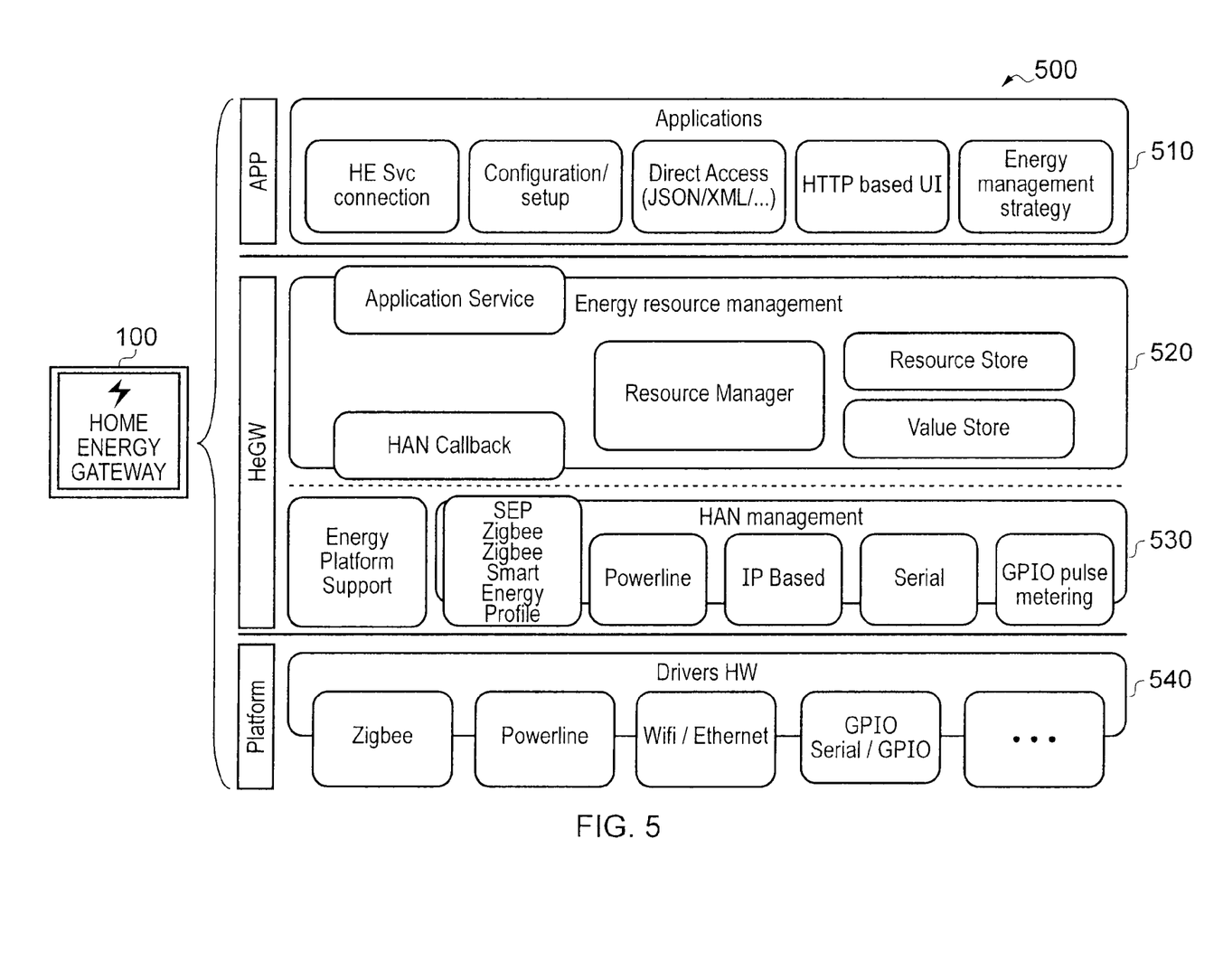
FIG. 5 describes a network protocol stack implemented in the home energy network according to embodiments of the present invention.

FIG. 5 shows a layered software stack 500 detailing the protocol using which the HEG 100 controls the different plug sockets 250. On the application layer 510, the graphical user interface (GUI) allows user interaction with the system when the system is run. Examples of the GUI are shown in FIG. 4. The GUI allows the user to see the operational status of the system as a whole by means of graphs and bar charts. Additionally, given a particular billing tariff, as the HEG 100 receives data from each of the plug sockets 250 relating to the energy consumption of each device, the GUI can display the overall cost of a device over a given period of time, such as a day, month or even year. Of course, it is possible to determine the overall cost of electricity consumption of the whole system over a period of time.

Although the GUI has been explained with reference to the display of data, the GUI is also used to control the HEG 100. More specifically, the user can interact with the GUI to determine the setup of the HEG. For example, as noted before, certain plug sockets 250 can be grouped together. This allows a group of devices to be formed. These groups may be numerous. For example, all plug sockets 250 in the living room can form one group. However, other groups may be formed such as a high priority group which must never be switched off. Plug sockets in this group are connected to devices which may include a fridge or freezer, power to certain security lights, to heating systems or cooking appliances. Also, plug sockets 250 may move from one group to another group at a certain time. For example, during the summer, the heating system may be a medium priority plug socket because the weather is typically warm outside. However, during winter when the weather is cold, the plug socket connected to the heating system will become a high priority plug socket. Similarly, during daylight hours, the plug socket connected to the security light may be a low priority plug socket. However, during the evening, the plug socket connected to the security lights will become a high priority plug socket.

The user defined setup is stored in memory accessible by the HEG 100. For example, the memory may be located within the HEG 100 or may be located remotely from the HEG 100 but is accessible by the HEG 100. For example, the memory may be located over a network. Also stored within the memory is the data collected by the HEG 100 from each of the plug sockets 250. Specifically, the HEG 100 stores data identifying the plug socket 250 and stores data identifying the amount of electricity consumed or generated by the plug socket 250 at any one time. The time at which a device connected to a certain plug socket 250 consumes or generates the electricity is also stored. This is part of an upper tier of the Home Energy Gateway application layer 520. This data is fed down to the lower tier of the Home Energy Gateway application layer 530 which provides control instructions to be fed to the different plug sockets 250.

The data fed from the lower tier of the Home Energy Gateway application layer 530 is fed down to the drivers for the hardware layer 540 which sends instructions to each plug socket 250.

A number of different scenarios using the above system will now be described

Scenario 1

The above system enables the intelligent control of power to different devices around the home. For example, if one of the groups of the devices consists of a personal computer (PC) connected to a dedicated monitor and a dedicated printer, then when the computer is switched off, the monitor or the printer will not be used. However, if the printer is switched off, the PC and the monitor may still require power. Therefore, the power status of the PC determines the power status of the monitor and printer. Accordingly, the plug socket 250 to which the PC is connected is a "master" plug socket in a group formed of the PC, monitor and printer, and the plug socket connected to the monitor and the printer are "slave" plug sockets. So, when the PC is switched off, the mains adaptor 315 in the "master" plug socket informs the HEG 100 that the PC has been switched off. The HEG 100 then sends a command to the "slave" plug sockets instructing those sockets to switch the power off to those "slave" devices.

It is also possible to set the amount of power down applied to each "slave" device. For example, the HEG 100 can instruct the "slave" plug socket to place the device into standby when the power to the "master" device is switched off. This control over the amount of shut-down in the slave device is useful if the slave device needs to start quickly, or if user data needs to be retained.

Additionally, a plug socket connected to a light may be the "master" plug socket for all devices in the room during night-time hours. When the light is switched off, then it is assumed that the room is no longer in use. Therefore, the devices in that room can be appropriately shut-down or placed into standby. However, during daylight hours, the plug socket to which the light is connected may not be a "master" plug socket. Indeed, a motion sensor could be attached to the HEG 100. In this case, if the motion detector detects the movement of another person in the room, if the light connected to the master socket is switched off, then if the motion detector detects movement in the room, the remaining "slave" plug sockets are not switched off. In other words, the allocation of a plug socket to be a master or slave plug socket in a group may change at different times of the day, month or year.

Scenario 2

As noted above, the HEG 100 is configured to record the usage of each plug socket 250 within the network during the day. Therefore, the HEG 100 stores the operational status of each device in the network at all times during the day. Over time, this means that a typical usage profile for the network can be formed. This is advantageous in a security scenario when a user is away from the house.

Typically, when a user leaves a property for a number of days, they attach electrical devices to timers which switch on and off at certain times. However, over time, it becomes apparent that the user is not in because the lights and devices switch on at the same time irrespective of the day of the week.

For example, on a weekday (Monday-Friday), as many people work, the energy consumption in a network is low compared to the evening when many devices such as televisions, PCs, lights and cooking equipment are used as people return from work. Similarly, during the day at the weekend, when many people do not work, the usage pattern is very different to the usage pattern of the daytime usage Monday-Friday. Therefore, an observer would see that having the same devices coming on at the same time, irrespective of the day of the week, is unconvincing.

Using the information stored by the HEG 100, it is possible to identify the time and day that different devices are operational. For example, a plug socket to which a radio is connected may be on every day Monday to Friday between 6 am until 8.30 am, a kitchen light is on between 5.30 pm until 8.30 pm, and is on again between 10 pm and 10.30 pm. However, during the weekend, the radio may be on between 8 am and 10 am and the kitchen light may be one 4 pm until 10 pm.

Therefore, when a user leaves the house for a period of time, it is possible for the user to set a security group of devices which switches the plug sockets on and off in accordance with the energy usage pattern observed by the HEG 100.

In a default situation, all the devices that a user would normally use would be operated.

However, this may mean that unnecessary lights and devices are operated which increases cost and environmental impact. In order to reduce the costs and environmental impact, the user may define different categories of device. For example, if one light is a security light at the front of the house and is easily observed and a second light is a kitchen light in the back of the house and, as such is not visible to an observer, the user may decide to not switch on the kitchen light, but the security light must be switched on during the security mode. This reduces costs and environmental impact.

Moreover, the user may wish to set an energy cap to ensure that the energy expenditure does not exceed a threshold. In this case, the user may wish to switch on the kitchen light if the fixed battery has a certain level of charge. Additionally, the user may wish to allocate energy to certain groups of devices to operate during security mode. For example, the user may wish for the fridge and freezer and all security lights to operate irrespective of the cost. However, the user may define other devices such as interior lights and a radio as being a medium priority device. Low priority devices such as televisions may also be set. The user can then allow the medium priority devices to operate only when enough energy has been generated by the solar panels, or a certain level of energy is stored in the fixed battery. Similarly, low priority devices will only be allowed to operate if all the medium priority devices are operational.

Scenario 3

Although the foregoing has been described as monitoring usage patterns, it is possible to use the HEG 100 to monitor energy production. As noted earlier, the solar panels 255 are connected to the network 200. The solar panels are typically connected using a grid-tied-inverter placed in front of the mains circuit breaker. The power generated by the solar panel will be monitored using a smart meter. It is therefore possible to determine the amount of energy produced by the solar panels 255 over a given timeframe.

It may be desirable for a user to define one or more plug socket(s) within the network which will only operate when the device can be powered by energy from the solar panels 255. This is termed a "green plug". This energy may be instantaneous energy (i.e. energy that is currently being generated by the solar panel 255) or may be energy that is produced by the solar panels but stored in the fixed battery 260. In other words, the "green plug" uses energy that is generated within the home and does not use energy from the mains supply 230. The "green plug" may only operate when the consumption of the device connected to the network is less than the power supplied by the solar panel or fixed battery 260 or the actual power to the device may be reduced when the power from the fixed battery 260 or the power from the solar panel is reduced. It is also envisaged that the "green plug" may have a combination of energy provided simultaneously by both the solar panel and the fixed battery. For example, if the energy provided by the solar panels is low, then the fixed battery may supplement the energy provided to the green plug to operate devices.

Additionally, the HEG 100 determines the difference between the instantaneous energy generated by the solar panel 255 and the energy consumed by the device. If the device does not consume all the energy that is produced by the solar panel 255, then the surplus renewable energy is stored in the fixed battery 260.

One example of this is charging batteries, for example in an electric vehicle. A user may wish to only charge the electric vehicle when there is locally produced electricity as this is free. Moreover, the green plug may be configured to operate only when the locally produced electricity (for example from the solar panels) exceeds the consumption of the electricity. In other words, the green plug only operates when there is a surplus of locally generated electricity. The amount of power supplied to the batteries can be varied depending on the amount of renewable energy supplied by the solar panels 255. In other words, if the amount of energy supplied by the solar panels 255 is low then the fixed battery will be charged slowly. However, if the energy supplied by the solar panel 255 is high, then the battery will be charged more quickly. Another example may be an electric fan used to cool a room. The amount of current provided to the fan may be reduced when the amount of electricity produced by the solar panels or fixed battery is low. However, with some other devices (such as televisions) it is not possible to reduce the amount of power whilst still having the device operational. In this case, the device may only be powered for a specified period from the solar panels. Also, in embodiments, the device attached to the "green plug" may be powered from a priority of sources. For example, the green plug may power the device from the solar panels as a first priority, then as a second priority, the device may be powered from the fixed battery and finally, the device may be powered from the mains electricity.

Indeed, with some devices, like refrigerators, it may be appropriate to power the fridge from the green plug for a short period of time (to cool the interior of the refrigerator), and then to supply power again a short while later. This would reduce the amount of overall power used by the refrigerator.

Moreover, in the situation where the user would like to have a different socket allocated to be the "green plug", the display devices 225 or 205 may show the network containing all the plugs in the network. The user would then simply be able to touch the appropriate plug and make this a "green plug". This selection would be passed back to the home network gateway and the profile of the plug socket would be updated. Indeed, the graphical user interface could be extended to show when a "green plug" does not have enough renewable energy provided by the solar panels or the fixed battery. In this case, the user will be given the option of using mains electricity to supplement or replace the locally generated power.

Although the foregoing has been explained with reference to the plug sockets having the mains adaptor 315 and the device adaptor 305, the invention is not so limited. It is possible that the mains adaptor 315 and the device adaptor 305 are integrated into the device itself. Of course, the memory 320 storing the identifier would also need to be integrated into the device. This would mean that rather than certain plug sockets being given certain status within the system, the device would have such a status. This means that the device can be plugged into any socket and moved around the house as required. Also, this means that conventional plug sockets can be used and would ensure backward compatibility.

Further, it is envisaged that the plug sockets may be an adaptor that can be plugged into a conventional plug socket. The device would then plug into the adaptor. Again this ensures backwards compatibility.

Further, although the foregoing has been explained with reference to the data being transferred over the mains network, the invention is not limited and the data may be transferred over a wireless, or wired network separate to the mains power system.

Although the foregoing has been explained with reference to solar panels, any form of renewable energy, such as a wind turbine is also envisaged.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

We claim:

1. A method of controlling power to a plurality of devices, comprising:
    forming a group of devices from said plurality of devices, the group of devices being arranged in use to be in communication with an energy network and having an identifier which uniquely identifies the device on the network;
    assigning a first device in the group of devices as a master device, and other devices in the group of devices excluding the first device as slave devices;
    controlling the power supplied from the energy network to the other devices assigned as the slave devices in accordance with a state of the power supplied from the energy network to the first device assigned as the master device by sending control signals over the energy network by circuitry;
    sending a power off command or a standby mode command to the other devices assigned as the slave devices when the power supplied from the energy network to the first device is switched off; and
    changing an assignment as the master device from the first device to one of the other devices in the group at a predetermined time of a day, a month or a year.

2. The method according to claim 1, further comprising controlling the power supplied from the energy network to each device in said group in accordance with a user defined criterion.

3. The method according to claim 1, comprising allocating a priority to each of the devices in the group, wherein the first device in said group is the device with the highest priority.

4. The method according to claim 1, comprising detecting the power consumed by said first device in the group and when said power consumed is below a threshold, controlling the power supplied from the energy network to the other devices in said group.

5. The method according to claim 4, wherein when said detected power consumed by said first device in the group is below the threshold but above a second threshold, assuming that the first device is in a standby power state.

6. The method according to claim 1 wherein at least one device in said group is placed into standby.

7. A non-transitory computer readable medium including executable instructions, which when executed by a computer cause a computer to execute a method of controlling power to a plurality of devices, the method comprising:
    forming a group of devices from said plurality of devices, the group of devices being arranged in use to be in communication with an energy network and having an identifier which uniquely identifies the device on the network;
    assigning a first device in the group of devices as a master device, and other devices in the group of devices excluding the first device as slave devices;
    controlling the power supplied from the energy network to the other devices assigned as the slave devices in accordance with a state of the power supplied from the energy network to the first device assigned as the master device by sending control signals over the energy network;
    sending a power off command or a standby mode command to the other devices assigned as the slave devices when the power supplied from the energy network to the first device is switched off; and
    changing an assignment as the master device from the first device to one of the other devices in the group at a predetermined time of a day, a month or a year.

8. An apparatus for controlling power to a plurality of devices on an energy network, the apparatus comprising:
    circuitry configured to
        form a group of devices from said plurality of devices wherein each device has an identifier allocated thereto which uniquely identifies the device on the network;
        assign a first device in the group of devices as a master device, and other devices in the group of devices excluding the first device as slave devices;
        control the power supplied from the energy network to the other devices assigned as the slave devices in accordance with a state of the power supplied from the energy network to the first device assigned as the master device by sending control signals over the energy network;
        send a power off command or a standby mode command to the other devices assigned as the slave devices when the power supplied from the energy network to the first device is switched off; and
        change an assignment as the master device from the first device to one of the other devices in the group at a predetermined time of a day, a month or a year.

9. The apparatus according to claim 8, wherein the circuitry is operable to control the power supplied from the energy network to each device in said group in accordance with a user defined criterion.

10. The apparatus according to claim 8, wherein the circuitry is configured to allocate a priority to each of the devices in the group, wherein the first device in said group is the device with the highest priority.

11. The apparatus according to claim 8, comprising a detector operable to detect the power consumed by said one device in the group and when said power consumed is below a threshold, controlling the power supplied from the energy network to the other devices in said group.

12. The apparatus according to claim 11, wherein when said detected power consumed by said first device in the group is below the threshold but above a second threshold, assuming that the device is in standby and controlling the power supplied from the energy network to the other devices in said group.

13. The apparatus according to claim 8 wherein at least one device in said group is placed into standby.

14. A system comprising:
an apparatus for controlling power to a plurality of devices on an energy network, the apparatus comprising:
circuitry configured to
form a group of devices from said plurality of devices wherein each device has an identifier allocated thereto which uniquely identifies the device on the network;
assign a first device in the group of devices as a master device, and other devices in the group of devices excluding the first device as slave devices;
control the power supplied from the energy network to the other devices assigned as the slave devices in accordance with a state of the power supplied from the energy network to the first device assigned as the master device by sending control signals over the energy network;
send a power off command or a standby mode command to the other devices assigned as the slave devices when the power supplied from the energy network to the first device is switched off; and
change an assignment as the master device from the first device to one of the other devices in the group at a predetermined time of a day, a month or a year; and
a plurality of devices coupled to the apparatus.

15. The method according to claim 1, wherein
the plurality of devices are connected to a home energy gateway that is connected to a main supply of electricity, and each of the plurality of devices has a plug socket.

16. The method according to claim 15, comprising assigning at least one of the plug sockets as a plug socket which only operates when the device connected to the assigned plug socket is powered by energy from a solar panel.

17. The method according to claim 16, wherein the assigning is conducted when a consumption of the devices is less than a power supplied by the solar panel or a fixed battery connected to the devices.

* * * * *